(12) United States Patent
Weksler et al.

(10) Patent No.: US 11,315,566 B2
(45) Date of Patent: Apr. 26, 2022

(54) CONTENT SHARING USING DIFFERENT APPLICATIONS

(71) Applicant: Lenovo (Singapore) Pte. Ltd., Singapore (SG)

(72) Inventors: Arnold S. Weksler, Raleigh, NC (US); Mark Patrick Delaney, Raleigh, NC (US); Russell Speight VanBlon, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 16/840,339

(22) Filed: Apr. 4, 2020

(65) Prior Publication Data
US 2021/0312917 A1    Oct. 7, 2021

(51) Int. Cl.
| | |
|---|---|
| *G10L 15/22* | (2006.01) |
| *H04L 51/52* | (2022.01) |
| *H04W 4/21* | (2018.01) |
| *G10L 15/30* | (2013.01) |
| *G10L 17/22* | (2013.01) |
| *G06F 3/16* | (2006.01) |

(52) U.S. Cl.
CPC ............. *G10L 15/22* (2013.01); *G06F 3/167* (2013.01); *G10L 15/30* (2013.01); *G10L 17/22* (2013.01); *H04L 51/32* (2013.01); *H04W 4/21* (2018.02); *G10L 2015/223* (2013.01); *G10L 2015/228* (2013.01)

(58) Field of Classification Search
USPC ...................... 704/1–504, 251, 231
See application file for complete search history.

(56) References Cited

U.S. PATENT DOCUMENTS

| 8,676,891 | B2* | 3/2014 | Su | H04L 67/10 709/204 |
|---|---|---|---|---|
| 8,676,892 | B2* | 3/2014 | Su | H04L 65/403 709/204 |
| 8,711,696 | B2* | 4/2014 | Khivesara | H04L 47/805 370/235 |
| 9,020,697 | B2* | 4/2015 | Ricci | G06F 9/451 701/36 |
| 9,082,239 | B2* | 7/2015 | Ricci | G06F 16/583 |
| 9,300,701 | B2* | 3/2016 | Smarr | H04W 4/21 |

(Continued)

*Primary Examiner* — Marcus T Riley
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to identify one or more commands to share content with first and second contacts. The instructions may also be executable to, based on the one or more commands to share the content, share the content with the first contact via a first application and share the content with the second contact via a second application that is different from the first application. The one or more commands to share the content may be received based on receipt of user input selecting respective selectors for the first and second contacts, where the respective selectors may be concurrently presented on a display and may each be associated with a different one of the first and second applications.

20 Claims, 6 Drawing Sheets

(56) References Cited

U.S. PATENT DOCUMENTS

| | | | |
|---|---|---|---|
| 9,313,240 B2* | 4/2016 | Su | H04L 51/14 |
| 9,338,197 B2* | 5/2016 | Smarr | H04L 67/1044 |
| 9,545,930 B2* | 1/2017 | Ricci | G06Q 10/02 |
| 9,967,335 B2* | 5/2018 | Smarr | H04L 65/403 |
| 9,972,304 B2* | 5/2018 | Paulik | G10L 15/07 |
| 10,122,791 B2* | 11/2018 | Smarr | G06Q 50/01 |
| 10,142,276 B2* | 11/2018 | Rapaport | H04L 12/1818 |
| 10,356,020 B2* | 7/2019 | Chao | G06F 16/176 |
| 10,567,257 B2* | 2/2020 | Adington | H04L 47/24 |
| 11,087,759 B2* | 8/2021 | Lemay | G06F 3/167 |
| 11,103,773 B2* | 8/2021 | Rathod | H04L 67/22 |
| 2012/0069131 A1 | 3/2012 | Abelow | G06Q 30/02 345/589 |
| 2012/0110052 A1* | 5/2012 | Smarr | G06F 3/048 709/201 |
| 2012/0110076 A1* | 5/2012 | Su | G06F 3/04817 709/204 |
| 2012/0110088 A1* | 5/2012 | Su | H04L 41/00 709/205 |
| 2012/0110096 A1* | 5/2012 | Smarr | H04L 67/1044 709/204 |
| 2012/0230195 A1* | 9/2012 | Khivesara | H04L 47/806 370/235 |
| 2013/0275519 A1* | 10/2013 | Nichols | H04L 67/36 709/206 |
| 2014/0143342 A1* | 5/2014 | Su | G06F 3/048 709/204 |
| 2014/0143403 A1* | 5/2014 | Su | H04L 67/1044 709/223 |
| 2014/0309806 A1* | 10/2014 | Ricci | G06Q 10/20 701/1 |
| 2014/0309813 A1* | 10/2014 | Ricci | H04N 21/41422 701/1 |
| 2014/0309862 A1* | 10/2014 | Ricci | H04W 36/34 701/36 |
| 2014/0309863 A1* | 10/2014 | Ricci | G06Q 50/30 701/36 |
| 2014/0309870 A1* | 10/2014 | Ricci | H04L 51/02 701/36 |
| 2014/0310031 A1* | 10/2014 | Ricci | G06Q 10/20 705/5 |
| 2014/0310610 A1* | 10/2014 | Ricci | H04W 4/80 715/744 |
| 2014/0310739 A1* | 10/2014 | Ricci | G06F 21/31 725/75 |
| 2014/0310788 A1* | 10/2014 | Ricci | G06Q 10/00 726/6 |
| 2014/0344718 A1* | 11/2014 | Rapaport | H04L 67/306 715/753 |
| 2015/0232065 A1* | 8/2015 | Ricci | A61B 5/6808 701/36 |
| 2016/0050266 A1* | 2/2016 | Smarr | G06F 3/04817 709/204 |
| 2016/0059865 A1* | 3/2016 | Ricci | B60R 25/00 701/36 |
| 2016/0247377 A1* | 8/2016 | Ricci | G06V 40/166 |
| 2017/0250940 A1* | 8/2017 | Chao | H04L 51/046 |
| 2018/0241656 A1* | 8/2018 | Adington | H04L 67/04 |
| 2018/0248942 A1* | 8/2018 | Smarr | H04L 67/10 |
| 2018/0345129 A1* | 12/2018 | Rathod | G06Q 20/0655 |
| 2018/0349703 A1* | 12/2018 | Rathod | H04W 4/029 |
| 2018/0350144 A1* | 12/2018 | Rathod | G06T 13/40 |
| 2019/0109810 A1* | 4/2019 | Rapaport | H04N 21/8358 |
| 2021/0312917 A1* | 10/2021 | Weksler | H04L 51/32 |

* cited by examiner

CONTENT SHARING USING DIFFERENT APPLICATIONS

FIELD

The present application relates to technically inventive, non-routine solutions that are necessarily rooted in computer technology and that produce concrete technical improvements.

BACKGROUND

As recognized herein, when a user wishes to electronically share a single piece of digital electronic content with multiple people, this task can become overly burdensome and time consuming. This is due to the fact that different people often prefer different ways of receiving the electronic content, and due to the fact that their respective devices might only be capable of receiving the content certain ways. Thus, the user must embark on the task of sharing the same piece of electronic content multiple times over, once for each person depending on preference and/or device capability. These problems become even more pronounced as the number of people with which the user wishes to share the same piece of electronic content increases. There are currently no adequate solutions to the foregoing computer-related, technological problem.

SUMMARY

Accordingly, in one aspect a first device includes at least one processor and storage accessible to the at least one processor. The storage includes instructions executable by the at least one processor to identify one or more commands to share content with first and second contacts. The instructions are also executable to, based on the one or more commands to share the content, share the content with the first contact via a first application and share the content with the second contact via a second application that is different from the first application.

In some implementations, sharing the content with the first and second contacts may include electronically transmitting the content to second and third devices respectively associated with the first and second contacts. Also in some implementations, the one or more commands to share the content may be identified based on receipt of user input selecting respective selectors for the first and second contacts, where the respective selectors may be concurrently presented on a display accessible to the at least one processor and may be associated with different applications.

In some examples, the first and second applications may be determined for sharing of the content based on a history of past content shares, where the history may be accessible to the first device. So, for example, the history may indicate past content shares between a user and the first and second contacts, and the history may specify the respective applications used for the past content shares.

Additionally, in some examples one or more of the first and second applications may be selected for sharing of the content based on contact information for the respective contact indicating application preference. So, for example, the contact information indicating application preference may be set based on receipt of input from the respective contact that is provided using a second device different from the first device. Additionally or alternatively, the contact information indicating application preference may be set based on receipt of input from a user of the first device, where the user may be different from the first and second contacts.

Still further, in some examples one or more of the first and second applications may be selected for sharing of the content based on a location at which the content was generated and/or based on a current location at which the content is accessed by the first device.

Also in certain examples, the content itself may include a photograph and/or video. In other examples, the content may be first content and the first content may include a link to a web page or other content different from the first content.

In another aspect, a method includes receiving one or more commands to share content with a first person and a second person, where the one or more commands to share the content are received based on receipt of user input selecting respective selectors for the first and second people that are concurrently presented on a display. The respective selectors are associated with different modes of communication. The method also includes, based on receiving the one or more commands, sharing the content with the first person via a first mode of communication and sharing the content with the second person via a second mode of communication different from the first mode of communication.

In some implementations, one or more of the first and second modes of communication may be determined for sharing of the content based on accessing a history of past content shares. Additionally or alternatively, one or more of the first and second modes of communication may be selected for sharing of the content based on accessing contact information for the respective first or second contact that indicates mode of communication preference. Still further, one or more of the first and second modes of communication may be selected for sharing of the content based on one or more of a time of day at which the content was generated and/or a time of day at which the content is accessed.

Also in some implementations, each of the first and second modes of communication may involve use of a different software application stored at a device, where the device may at least in part perform the method.

Additionally, note that in certain examples the first and second modes of communication may be selected from email, short message service, communication via a social networking service, and/or content upload to a cloud storage area.

In still another aspect, at least one computer readable storage medium (CRSM) that is not a transitory signal includes instructions executable by at least one processor of a device to identify content to be shared with first and second contacts. The instructions are also executable to, based on one or more commands to share the content, share the content with the first contact using a first application and share the content with the second contact using a second application different from the first application.

Thus, in some implementations the first and second applications may both be stored at the device. Additionally, the one or more commands to share the content may be received based on receipt of user input selecting respective selectors for the first and second contacts that are concurrently presented on a display and that are associated with different applications. Also in some implementations, the first and second applications may be selected based on a history of past application use for sharing content, one or more preferences for content sharing with the first or second contacts, a location at which the content was generated or is accessed, and/or a time of day at which the content was generated or is accessed.

The details of present principles, both as to their structure and operation, can best be understood in reference to the accompanying drawings, in which like reference numerals refer to like parts, and in which:

DETAILED DESCRIPTION

Figure 1:
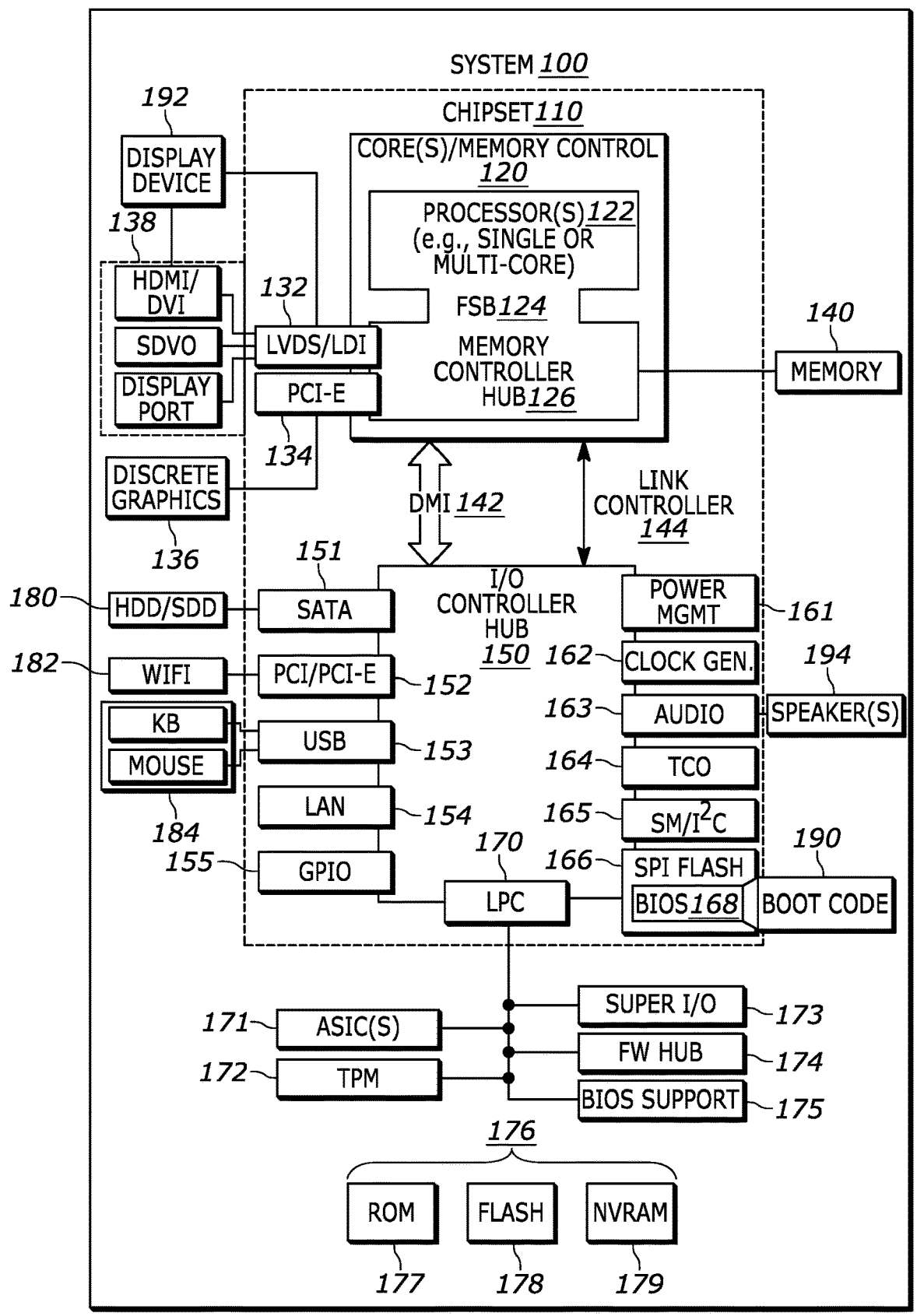
FIG. 1 is a block diagram of an example system consistent with present principles.

Among other things, the present application discloses ways for a user's device to share information with others using a "multi-share" option. Each recipient of the shared information can thus receive the information as customized to that particular recipient.

This may be accomplished by, for example, the user's device historically capturing how the user communicates with each recipient. The user's device may store that information (e.g., in contact information for the respective recipient). Thus, if the user typically text messages content to a given recipient, another piece of content to be shared (e.g., media) can be texted to that recipient. As another example, if the user typically uses a social media application like Facebook to interface with a given recipient, then the content to be shared can provided to the recipient using that social media application.

Additionally or alternatively, each recipient may have a preference on how they wish to receive content and/or the user may have a preference on how they wish to share content with that particular recipient. Data indicating those preferences may be stored at the user's device to share content accordingly.

Still further, in some implementations still other criteria may be used for content sharing, such as the location at which the content was generated. For example, if pictures were taken at the user's work location and recipients with whom the pictures are to be shared are also located at the work location, then a cloud account can be used while the user is at work or an email distribution group can be used, for example.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
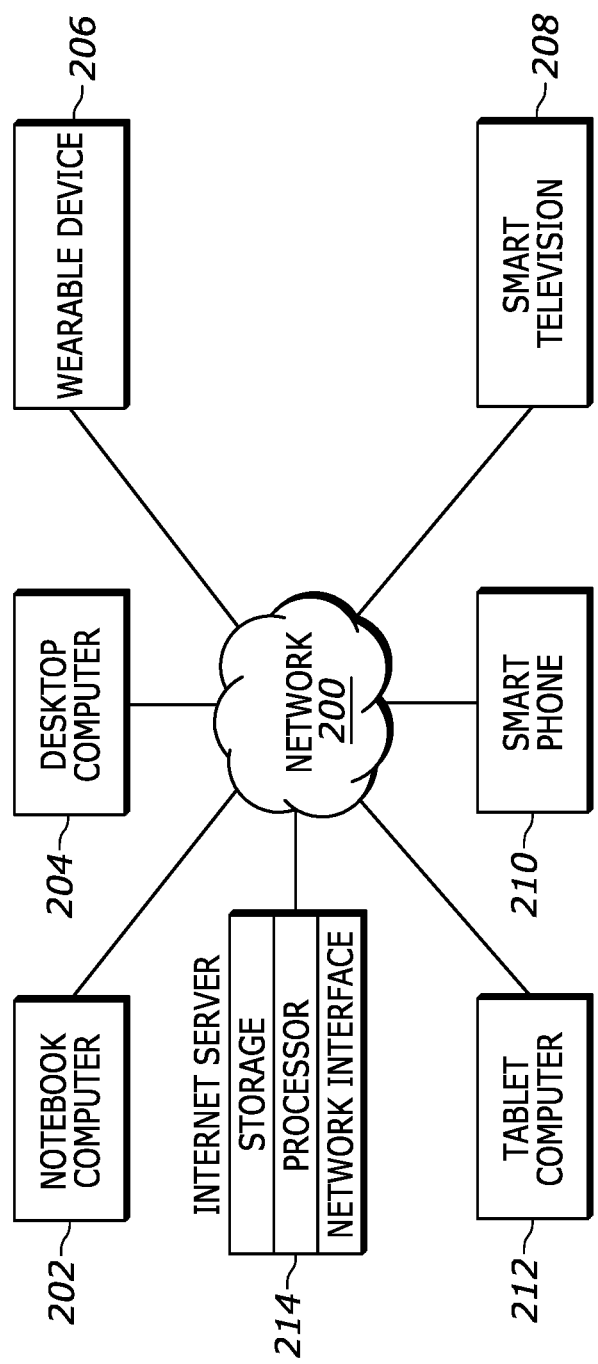
FIG. 2 is a block diagram of an example network of devices consistent with present principles.

Turning now to FIG. 2, example devices are shown communicating over a network 200 such as the Internet in order to share content consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles (e.g., share content, set share preferences, etc.).

Figure 3:
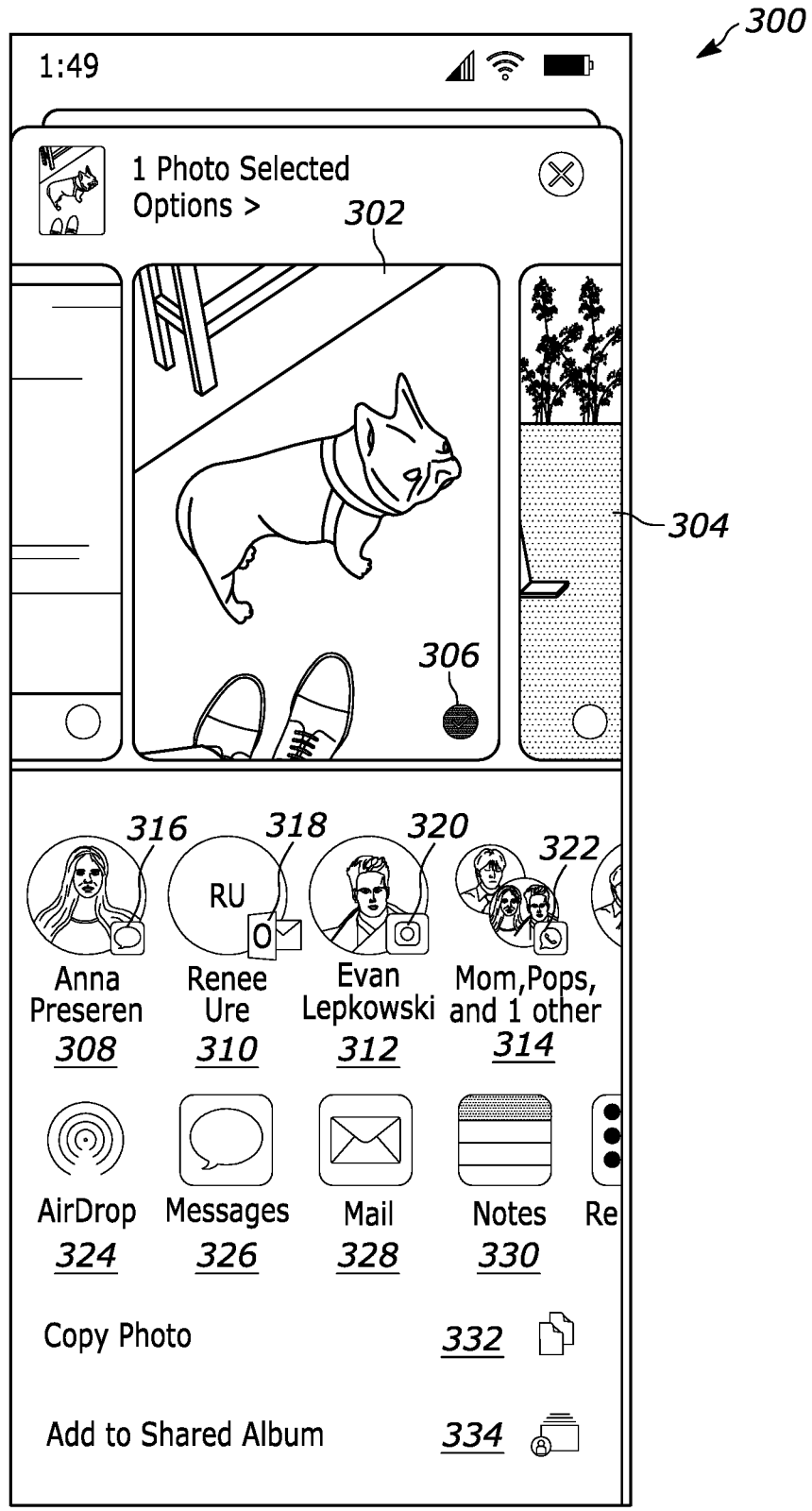
FIG. 3 shows an example graphical user interface (GUI) that may be used for content sharing consistent with present principles.

Referring now to FIG. 3, it shows an example graphical user interface (GUI) 300 that may be presented on the display of a first device associated with a user that wishes to share digital content. The GUI 300 may be presented, for example, responsive to touch or voice input to share a particular piece of digital content. For example, the command to share the content may be identified/received based on user selection of a "share" selector that might be superimposed over a portion of the content itself as presented on the display, or presented on another portion of the same display or application being used to present the content. As another example, a voice command to "share this photo" as spoken in reference to a photograph that is currently presented on the display may be received for the device, using a digital assistant with voice recognition, to recognize the command and then present the GUI 300.

The digital content itself may be, for example, a photograph, music or another audio file (e.g., voice file), a video or audio video content, and/or a three-dimensional graphical object (e.g., an augmented or virtual reality object). Additionally, note that the digital content may be presented at the first device regardless of whether the content is stored locally at the first device or accessed from remote storage (e.g., at a server).

However, also note that in some examples the content may be a link to a web page or other content that is itself presented at the first device. E.g., the link may be a uniform resource locator (URL) link, a file path link, a selector that itself links to the other content when selected, etc. and may be selected by the user for sharing.

As shown in FIG. 3, in this example the digital content to be shared is a photograph 302 of a dog as selected from an image list 304 presented on the first device's display. The image list may be scrollable left to right and vice versa using touch input to view different images and share them. As also shown, the photo 302 may be selected for sharing by directing touch input to circular selector 306, which is empty when not selected but when selected fills with blue background and a checkmark to denote selection as shown.

Then, either concurrently with initial presentation of the list 304 or responsive to selection of at least one photo from the list 304 for sharing (e.g., the photo 302 as shown), the first device may present various selectors 308-314 on the display. As shown, each selector 308-314 may be an icon including an image for a respective contact/person associated with the respective selector, text indicating the assigned name of the respective contact/person, and a mini-icon denoting the respective application stored at the first device (or mode of communication that would be used) to share the photo 302 with the respective contact/person should the respective selector be selected. The data used to present each of the selectors 308-314 may be included and stored as part of a contacts list for the user, for example.

As shown in FIG. 3, the selector 308 may be associated with a first contact and the mode of communication of cellular telephone text messaging using a cellular short messaging service (SMS)/text messaging application, as denoted by mini-icon 316 for that application. Also in this example, selector 310 may be associated with a second, different contact and the mode of communication of email using the Microsoft Outlook email application, as denoted my mini-icon 318 for that application. Selector 312 may be associated with a third, different contact and the mode of communication of social networking service sharing using the Instagram social networking application, as denoted by mini-icon 320 for that application. Thus, one or more of the selectors 308-312 (and selector 314 as described below) may be concurrently presented on the first device's display and may each be selectable a single time to provide respective commands to the first device to share the photo 302 with the respective contact associated with the respective selector using the respective designated mode of communication/application. Thus, only one, or more than one, of the selectors 308-314 may be selected at a given time for sharing of the photo 302.

Regarding the aforementioned selector 314, in this example the selector 314 may actually be associated with plural contacts different from the first, second and third contacts, as indicated via respective different texts of names of the plural contacts and respective different profile pictures for the plural contacts that are included as part of the selector 314. Thus, should the selector 314 be selected a single time to share the photo 302, in response the photo 302 may be electronically transmitted to each of the contacts associated with the selector 314 based on the single selection. Also note that in this example the selector 314 may be associated with an Internet instant messaging mode of communication using the Whatsapp application, as denoted by mini-icon 322.

Furthermore, note that in some examples selection of the selector 314 may command the first device to transmit the photo 302 to each of the contacts associated with the selector 314 in separate messages and/or message threads. However, in other examples, selection of the selector 314 may command the first device to transmit the photo 302 to each of the contacts as a group chat or group message so that all of the contacts and the user can communicate back and forth about the photo 302 in a single message thread after it is shared.

Additionally, though not shown for simplicity, note that a selector may also be presented next to the selectors 308-314 for uploading the photo 302 to the cloud storage account/area of one or more contacts of the user. Thus, that selector may be associated with yet another contact of the user to use the cloud storage mode of communication to share the photo 302 with the respective contact via that contact's personal cloud storage area.

As also shown in FIG. 3, in some examples the GUI 300 may concurrently present still other icons associated with various applications/modes of communication but not necessarily with respective contacts/people. For example, the selector 324 may be an icon associated with the AirDrop content sharing application and may be selectable to share the photo 302 by transmitting the photo 302 to another device also storing its own copy of the AirDrop application. The transmitting itself may be performed via Bluetooth or Wi-Fi direct/peer-to-peer Wi-Fi, for example. And the contact or other device itself to which the photo 302 is to be transmitted using the AirDrop application may be designed by the user using a GUI for the AirDrop application after the selector 324 is selected to initiate/launch the AirDrop application itself for sharing of the photo 302.

The selector 326 that is shown may be an icon associated with the same SMS/text messaging application as associated with the selector 308, but not associated with a particular contact as is the selector 308 itself. Thus, the selector 326 may be selectable to share the photo 302 via text message with one or more contacts the user may designate at a later time once the text message application is launched responsive to selection of the selector 326 to in turn cause the display to present a different GUI for the associated text message application itself to be presented. That different GUI may then be used to share the photo 302 directly through the text message application rather than whatever application might be used to present the GUI 300 itself (e.g., the GUI 300 may be presented as part of an operating system, a photo viewer application, an Internet browser application, etc.).

As also shown in FIG. 3, a selector 328 may be included on the GUI 300, where the selector 328 may be an icon associated with a different email application than the selector 310. The selector 328 also may not be associated with a given contact/person but may still be selectable to launch the associated email application itself for the user to then share the photo 302 through that application using a GUI for that other application.

As also shown, the GUI 300 may include a selector 330 that may be an icon associated with a notetaking application. The selector 330 may thus be selectable to launch/initiate the notetaking application so that the photo 302 may be pasted into a file that is editable using and managed from the notetaking application.

Further, in some examples the GUI 300 may also include a copy selector 332 to copy the selected photo 302 to a digital clipboard managed by the first device's operating system so that the photo 302 may be pasted to one or more other electronic locations at a later time. Also in some examples, the GUI 300 may include a selector 334 associated with a particular cloud storage folder/album or other storage area that is remotely located from the first device (e.g., hosted at an Internet server). The cloud folder/album itself may be associated with the user of the first device. It may also be associated with other contacts of the user so that those contacts can also upload content to the same folder/album, and/or the folder/album may otherwise permit electronic access to its contents by those contacts even if they are not allowed to upload content themselves.

Figure 4:
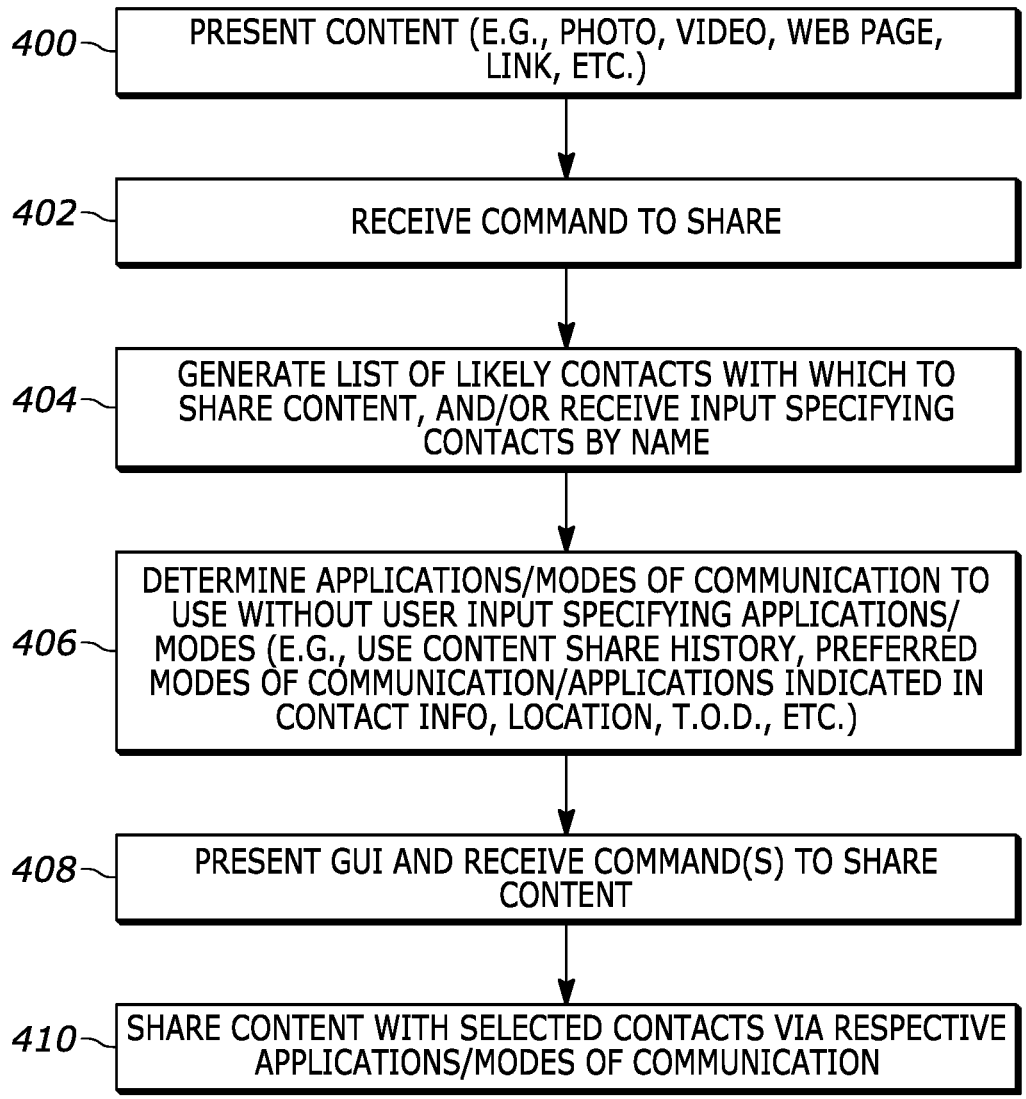
FIG. 4 shows a flow chart of an example algorithm consistent with present principles.

Referring now to FIG. 4, it shows example logic that may be executed by a device such as the system 100 and/or the first device described above in reference to FIG. 3 consistent with present principles. Beginning at block 400, the first device may present content such as a photo, video, web page, link, etc. on its display for viewing by the user. The logic may then proceed to block 402.

At block 402 the first device may receive a command to share the content as described above. From block 402 the logic may then proceed to block 404.

At block 404 the first device may generate a list of likely contacts with which to share the content. For example, at block 404 the first device may determine to present the selectors 308-314 for various contacts of the user based on those contacts being selected most-frequently for content sharing, as may be indicated in a content sharing history accessible to the first device (e.g., stored locally) that indicates previous content shares as well as the number of total times content has been shared with that respective contact using a particular mode of communication/application.

Additionally or alternatively, also at block 404 the first device may receive input from the user specifying contacts by name for which to share the selected content. But note that the input from the user, while it may specify the contact himself or herself, may not specify the mode of communication or application to be used for sharing the content with the contact. Instead, the first device may itself determine (e.g., from a content share history) the mode of communication and/or application to use without additional input from the user other than specifying the contact himself or herself. The first device may do so, for example, based on the selected mode of communication/application being most-frequently used for content sharing with that particular contact (e.g., as indicated in the history).

Also at block 404, other factors that will be set forth further below may also be used for the first device to determine which contacts to use for sharing of the content and/or which applications/modes of communication to use for those respective contacts. For example, that those factors might include the user or contact designating a particular application/mode of communication to use for the contact for content sharing, as well as the current time of day and current location of the first device itself when attempting to share the content (e.g., as determined using GPS coordinates).

From block 404 the logic may proceed to block 406. At block 406 the first device may determine which applications/modes of communication to use without the user specifying which applications and/or modes of communication to use, even if the user does specify the contact himself or herself with whom the content is to be shared. As noted above, the applications/modes may be determined from a content share history related to past content shares, where that history may indicate past content shares between the user and various contacts of the user and may specify the respective applications/modes used and how many times each one was used for past content shares. Then the most-frequently used application/mode for a given contact may be selected at block 406 as the application/mode to use in the present instance.

Additionally or alternatively, the application/mode to use for each contact that is determined at block 406 may be determined based on data in a contacts list for the user/first device that indicates preferred applications/modes for respective contacts of the user. The preferred applications/modes may have been specified by the user himself or herself, and/or may be specified by the contact, and then included in information in the user's contacts list for the entry for the respective contact. In either case, the contacts list and associated preferred application/mode data may be stored at the first device or at another location to which the first device has access (e.g., cloud storage).

Still further, in addition to or in lieu of the foregoing, the application/mode to use for each contact that is determined at block 406 may be determined based on location, time of day, the type of content to be shared, and/or bandwidth required to share the content over a particular communication medium and any possible latency for that medium.

For example, the location at which the content was generated may be used where, e.g., the content is a photo or video generated using a camera on the first device itself. Thus, should the content be generated at a location associated with the user's work, business, or profession, both contacts with which to share the content as well as respective applications/modes to use for those contacts may be selected that are associated in contact information or a relational database with the user's work, business, or profession. For example, if a photograph is taken using the first device's camera while the user is at his or her office, a work-related contact of the user with which the user frequently shares photos may be recommended (e.g., via the GUI 300) along with use of an email application used by the user for work to communicate with the other person. Conversely, if the user takes the photo while at his or her personal residence, then personal contacts of the user and other associated applications/modes of communication may be recommended.

The same can be said for time of day in that content generated during business hours from 8:00 a.m. local time to 5:00 p.m. local time may be used to determine work-related contacts and associated applications/modes that the user typically uses for content sharing during business hours. Conversely, content generated during non-business hours (e.g., night and weekend hours) may be used to determine personal-related contacts and associated applications/modes that the user typically uses for content sharing during non-business hours.

Still in reference to block 406, in some examples the first device may also determine contacts and associated applications/modes to use based on a current location of the first device when the content is accessed and/or a current time of day at which the content is accessed, even if that is not the same location or time of day at which the content itself was generated.

Thus, should the content be accessed while the first device is at a location associated with the user's work, business, or profession, both contacts with which to share the content as well as respective applications/modes to use for those contacts may be selected that are associated in contact information or a relational database with the user's work, business, or profession. For example, if a web page is accessed at the first device while the user is at his or her office, a work-related contact of the user with which the user frequently shares website links in particular may be recommended (e.g., via the GUI 300) along with use of an email application used by the user for work to communicate with the other person. Conversely, if the user accesses the website while at his or her personal residence, then personal contacts of the user and other associated applications/modes may be recommended.

The same can be said for time of day in that content (e.g., a link) accessed or selected by the user during business hours may be used to determine work-related contacts and associated applications/modes that the user typically uses for link sharing during business hours. Conversely, links accessed or selected by the user during non-business hours may be used to determine personal-related contacts and associated applications/modes that the user typically uses for link sharing during non-business hours.

As also mentioned above, at block 406 bandwidth required to share the content over a particular communication medium and/or current latency metrics for sharing the content over the particular medium may be used to determine which contacts and/or applications/modes to recommend or use. Regarding bandwidth consumption and latency, if one application and/or mode of communication provides greater bandwidth for faster content transmission than another application/mode and the file size of the content to be shared is above a certain byte threshold for large files, then the application that provides the greater bandwidth/less latency for transmission of the content may be used. For example, SMS communication may not provide adequate bandwidth to quickly or successfully transmit an ultra high definition (UHD) video, but upload to a cloud storage area might and so the associated cloud storage application may be selected for recommendation for the sharing of the UHD video with a particular contact.

Regarding type of content to be shared, at block 406 this may be used for determining which application/mode to use to transmit a given piece of content to a particular contact. To make a determination based on content type, a relational database associating types of content with respective applications/modes to use may be accessed by the first device. For example, a link to a website might be specified in the database as being suitable for SMS transmission or email transmission even if a UHD video is not, whereas the UHD video may be suitable for upload to a cloud storage area. As another example, the database may indicate that still photographs are to be shared using a social networking application to thus share still photos via the associated social networking service itself (e.g., as a post in a newsfeed for friends at large to view or as a direct message to another particular social networking user).

Still in reference to FIG. 4, from block 406 the logic may proceed to block 408. At block 408 the first device may present the determined contact and application/mode from block 406 at the first device, e.g., as selectors such as the selectors 308-314 for respective contact/application combinations for sharing of the content. Also at block 408, the first device may then receive one or more commands to share the content via user selection of one or more of the respective contact/application combination selectors.

Then, responsive to one or more of the commands that are received, and/or responsive to selection of a "share" or "submit" selector after the user selects one or more of the respective contact/application combinations, at block 410 the first device may share the content with the selected contacts via the respective applications/modes associated with the respective contacts by, e.g., launching the respective application for each mode and autonomously controlling the respective application to transmit/share the content electronically. Again, this may be done based on the user selecting a selector associated with a respective contact/application combination determined by the first device rather than based on the user himself or herself otherwise further specifying use of that application for that particular content share after separately specifying the contact himself or herself.

Figure 5:
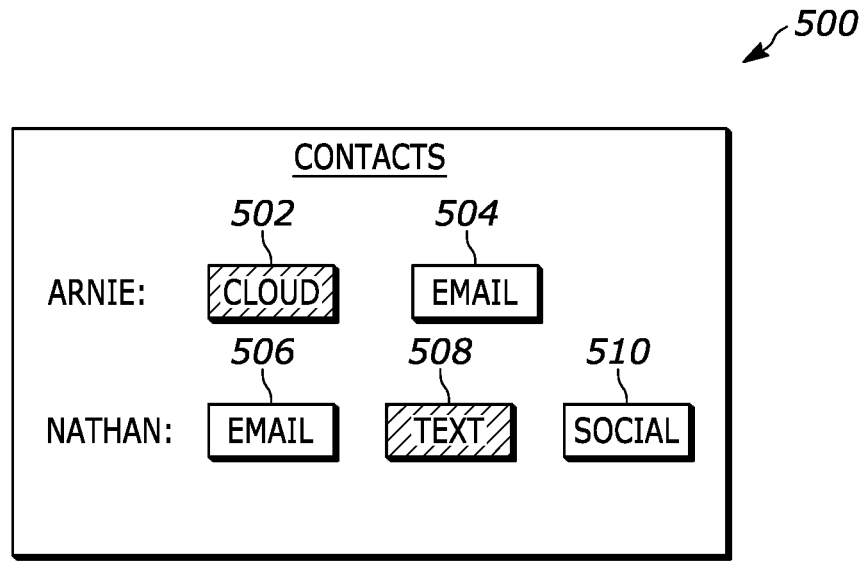
FIGS. 5-7 show example GUIs that may be used for designating preferences for particular applications and/or modes of communication to use for content shares consistent with present principles.

Now in reference to FIG. 5, it shows an example GUI 500 that may be presented on the display of the first device of the user as described above. As shown, the GUI 500 may establish a contacts list for the user and may have been presented responsive to input to present the user's contacts list and/or selection of a contacts list icon from the display of the first device. In any case, note that although only two contacts ("Arnie" and "Nathan") are shown for simplicity, more than two contacts may be presented at a given time depending on the number of contacts in the user's contacts list.

The GUI 500 may be used for the user himself or herself to select a particular application or mode of communication for the first device to use for content shares with that respective contact consistent with present principles. Thus, cloud storage and email selectors 502, 504 may be presented for Arnie based on the first device determining that Arnie's associated device is capable of or enabled for that respective mode of communication and/or has the associated application already downloaded and stored at Arnie's device. Note that the capabilities of Arnie's device and the applications it has stored may be determined by the first device based on communication with Arnie's device itself.

As shown in FIG. 5, selector 502 may be selected to select cloud storage content shares with Arnie, while selector 504 may be selected to select email shares. In this case, selector 502 has already been selected by the user, as denoted by the shading shown for the selector 502.

Regarding Nathan, as shown an email selector 506, text message selector 508, and social networking service selector 510 may all be presented. And in this case, the text message selector 508 has been selected by the user to designate text message communication for content shares with Nathan (denoted by the shading for the selector 508).

Figure 6:
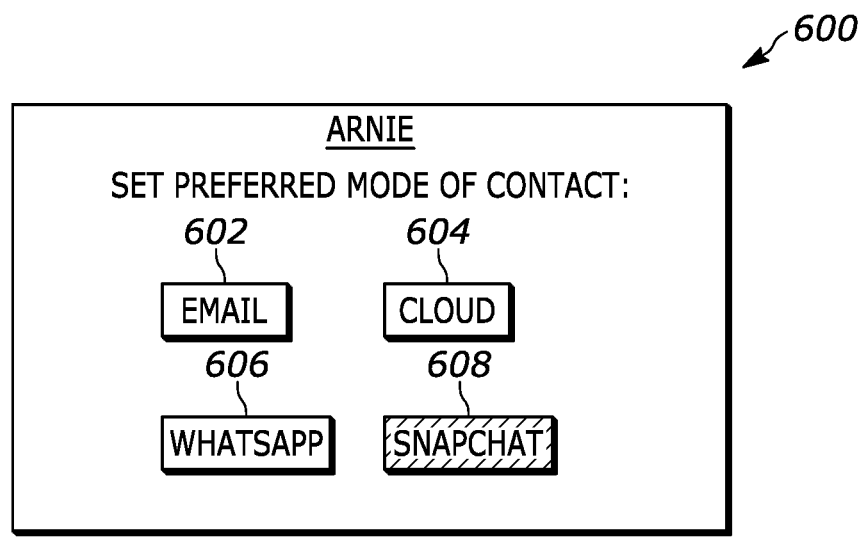

FIG. 6 shows yet another example GUI 600 that may be presented on the display of the user's device/first device consistent with present principles. However, rather than selecting from one of the selectors presented as part of a contact list as in FIG. 5, in FIG. 6 a contact information page or window specifically for one of the contacts from the user's contact list is presented to provide another way in which the user may designate one or more applications or modes to use for content shares with the respective contact. Thus, the GUI 600 may be presented, for example, responsive to the user selecting the particular contact himself or herself from the contact list.

In FIG. 6, the respective contact is Arnie again, but in this case the first device presents selectors 602-608 for various applications/modes. As shown, selector 602 may be selected to select email communication for content shares, selector 604 may be selected to select uploads to a cloud storage area for content shares, selector 606 may be selected to select the Whatsapp software application for content shares, and selector 608 may be selected to select the Snapchat software application for content shares. In this case, shading for selector 608 indicates that the user has selected the selector 608 and hence the Snapchat software application for content shares with Arnie.

Figure 7:
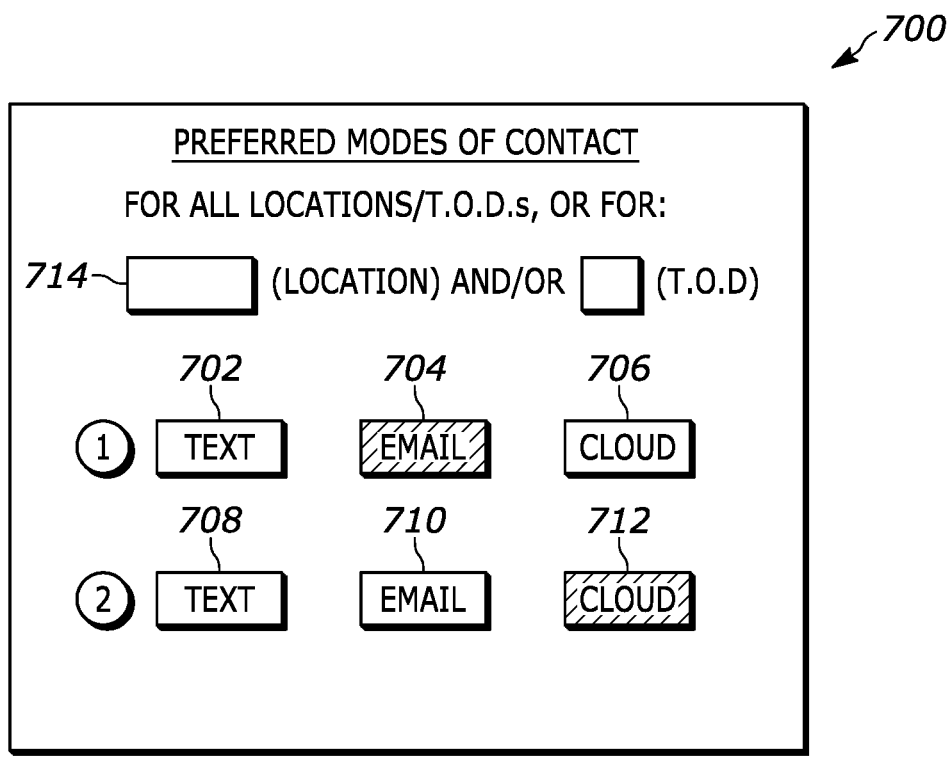

FIG. 7 shows yet another GUI 700 consistent with present principles. However, in this example the GUI 700 may be presented not at the first device associated with the user but instead on the display of another device for a contact of the user himself or herself. The GUI 700 may then be controlled by the contact to designate or rank various applications/modes to use to receive content shares from the user of the first device specifically or from others at large.

To do so, the contact may select one of the selectors 702-706 for various applications/modes. Further, if the user wishes to rank applications/modes from high to low in order of preference for use for content shares, selectors 708-712 may also be presented. Rankings may be useful where, for instance, a given device from which a content share is to be received might not have its own copy of the contact's preferred application for content shares, but may have its own copy of a lower-ranked application that the contact has also designated for content shares as a lower-ranked choice. Rankings may also be useful given bandwidth and content type considerations as described above, as another example. Regardless, in this case the contact has selected email selector 704 to designate email communication as the contact's primary preferred mode of communication (designated by the shading shown) and the contact has also selected the cloud storage selector 712 as his or her secondary preferred mode of communication (also designated by the shading shown).

Additionally, in some examples the contact may even set different content share preferences for different times of day and/or locations. Thus, input box 714 may be presented for the contact to provide input designating particular locations at which selections from the selectors 702-712 may be applied. Input box 716 may also be presented for the contact to provide input designating a particular time or time range during which selections from the selectors 702-712 may be applied. If no input is directed to either of boxes 714 or 716, then the selections from the selectors 702-712 may be applied on a universal basis for content shares regardless of location and/or time of day. And if input is directed to only one of the boxes 714 or 716, then the selections from the selectors 702-712 may be applied according to the input to that box and on a universal basis according to the other metric (e.g., any time if the time box 716 is left blank, or any location if the location box 714 is left blank).

Then, once the contact has made one or more application/mode preference selections using the GUI 700, the contact's device may transmit data indicating the selections/preferences to the first device of the user and/or to the devices of others so that those other devices may share content with the contact according to the contact's selections and/or rankings. Additionally or alternatively, the selections/preferences may be uploaded to a server to which the first device of the user (and possibly other devices) have access so that the user's device may determine a preferred application/mode for content sharing with that particular contact by accessing the data at the server.

Figure 8:
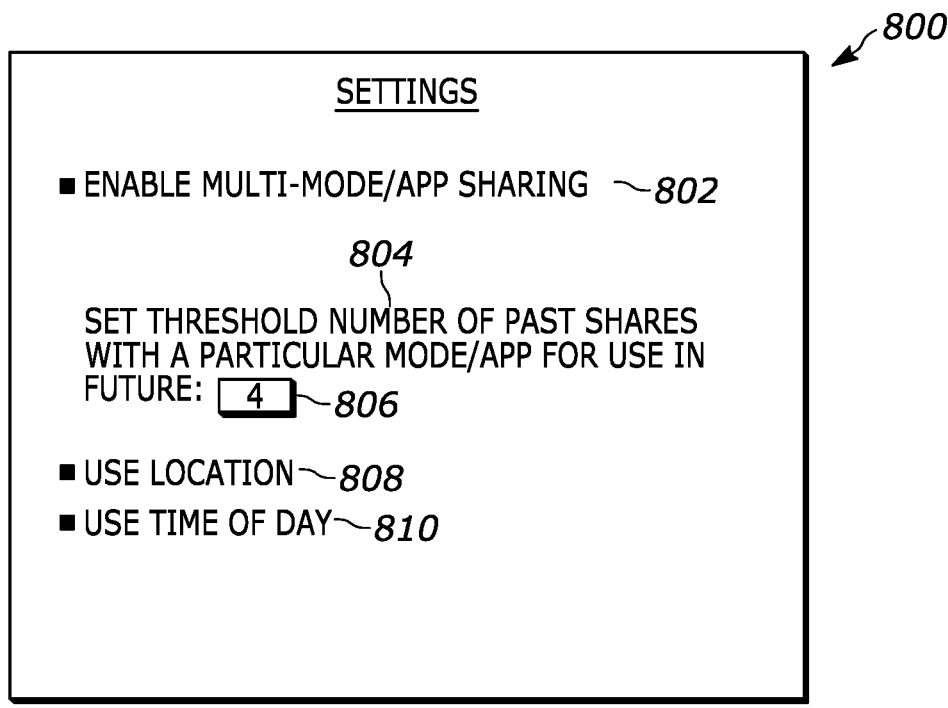
FIG. 8 shows an example GUI that may be used to configure one or more settings of a device to undertake present principles.

Continuing the detailed description in reference to FIG. 8, it shows an example GUI 800 that may be presented on the display of the first device of the user for configuring content sharing settings consistent with present principles. As shown, the GUI 800 may include a first option 802 that may be selectable a single time via the adjacent check box in order to enable or set the first device to perform content shares to multiple contacts across multiple different modes/applications in the future as described herein. For instance, selection of the option 802 may set the first device to present the GUI 300 of FIG. 3 and/or undertake the logic of FIG. 4.

The GUI 800 may also include a section 804 at which the user can set a threshold non-zero number of past individual content shares with a particular contact using a particular mode/application. The threshold may then be used for the first device to later recommend/use that mode/application in the future for that contact once the threshold is met. To establish the threshold, the user may enter numerical input into input box 806 and, in this case, the user has entered the number four.

Still in reference to FIG. 8, in some examples the GUI 800 may also list various other factors for the first device to apply when determining applications/modes to use or recommend for a given content share consistent with present principles. For example, an option 808 may be presented for the user to select use of location (e.g., location where the content to be shared was accessed). As another example, an option 810 may be presented for the user to select use of time of day (e.g., time of day where the content to be shared was accessed). Other factors as described above may also be listed as options on the GUI 800.

It may now be appreciated that present principles provide for an improved computer-based user interface that improves the functionality and ease of use of the devices disclosed herein in relation to electronic content sharing over electronic communication networks. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one computer readable storage medium (CRSM) that is not a transitory signal, the at least one computer readable storage medium comprising instructions executable by at least one processor to:
   identify one or more commands to share content with first and second contacts; and
   based on the one or more commands to share the content and based on bandwidth to be used to share the content, share the content with the first contact via a first application and share the content with the second contact via a second application different from the first application;
   wherein the first application is selected for sharing the content with the first contact based on the first application providing greater bandwidth for faster transmission of the content than use of a third application for sharing the content with the first contact.

2. The first device of claim 1, wherein one or more of the first and second applications are selected for sharing of the content based on contact information for a respective contact indicating application preference, and wherein the contact information indicating application preference is set based on receipt of input from the respective contact that is provided using a second device different from the first device.

3. The first device of claim 1, wherein one or more of the first and second applications are selected for sharing of the content based on a geolocation at which the content was generated.

4. The first device of claim 1, wherein one or more of the first and second applications are selected for sharing of the content based on a current geolocation at which the content is accessed by the at least one processor.

5. The first device of claim 1, wherein the content comprises one or more of: a photograph, or a video.

6. The first device of claim 1, wherein the content is first content, and wherein the first content comprises a link to a web page or other content different from the first content.

7. A method, comprising:
   receiving one or more commands to share content with a first person and a second person, wherein the one or more commands to share the content are received based on receipt of user input selecting respective selectors for the first and second people, the respective selectors being concurrently presented on a display, the respective selectors being associated with different modes of communication; and
   based on receiving the one or more commands and based on one or more current latency metrics for content transmission, sharing the content with the first person via a first mode of communication and sharing the content with the second person via a second mode of communication different from the first mode of communication;
   wherein the one or more current latency metrics comprise respective latency metrics for content transmission respectively via the first mode of communication and a third mode of communication, the third mode of communication also usable for sharing the content with the first person.

8. The method of claim 7, wherein one or more of the first and second modes of communication are selected for sharing of the content based on one or more of: a time of day at which the content was generated at a device at which the one or more commands are received, a time of day at which the content is accessed at the device prior to receipt of the one or more commands to share the content with the first person and the second person.

9. The method of claim 7, wherein each of the first and second modes of communication involves use of a different software application stored at a device, the device at least in part performing the method.

10. At least one computer readable storage medium (CRSM) that is not a transitory signal, the at least one computer readable storage medium comprising instructions executable by at least one processor of a device to:

present a graphical user interface (GUI) on a display, the GUI comprising an option that is selectable to set the device, for multiple future instances of content sharing, to:

identify a particular piece of content to be shared with plural contacts; and based on one or more commands to share the particular piece of content with plural contacts, share the content with plural contacts using different respective applications, wherein the different respective applications to use to transmit the particular piece of content are determined based on a file size for the particular piece of content.

11. The CRSM of claim 10, wherein the different respective applications are selected for sharing the particular piece of content based on one or more of: a geolocation at which the content was generated or is accessed, a time of day at which the particular piece content is to be shared.

12. The first device of claim 1, wherein the instructions are executable to:

based on the one or more commands to share the content, based on the bandwidth to be used to share the content, and based on a file size of the content itself, share the content with the first contact via the first application and share the content with the second contact via the second application.

13. The first device of claim 1, wherein the instructions are executable to:

based on the one or more commands to share the content, based on the bandwidth to be used to share the content, and based on a file size of the content itself being above a particular byte threshold, share the content with the first contact via the first application and share the content with the second contact via the second application.

14. The first device of claim 1, wherein the instructions are executable to:

based on the one or more commands to share the content and based on bandwidth to be used to share the content, launch the first application at the first device to share the content with the first contact via the first application and launch the second application at the first device to share the content with the second contact via the second application.

15. The first device of claim 1, wherein the instructions are executable to:

present a settings graphical user interface (GUI) on a display, the settings GUI being different from the content, the settings GUI comprising an option that is selectable to set the first device to perform the identifying and sharing steps for multiple future instances of content sharing.

16. The method of claim 7, wherein the first mode of communication is selected for sharing the content with the first person based on the first mode of communication providing less latency for transmission of the content than use of the third mode of communication for transmission of the content to the first person.

17. The method of claim 7, comprising:

presenting a graphical user interface (GUI) on the display, the GUI being different from the content, the GUI comprising an option that is selectable to enable a device to perform the receiving and sharing steps for multiple future instances of content sharing.

18. The first device of claim 1, comprising the at least one processor.

19. The first device of claim 18, comprising a display accessible to the at least one processor, wherein the instructions are executable to:

present the content on the display.

20. The method of claim 7, comprising:

based on a file size for the content, sharing the content with the first person via the first mode of communication.

* * * * *